United States Patent Office 3,248,171
Patented Apr. 26, 1966

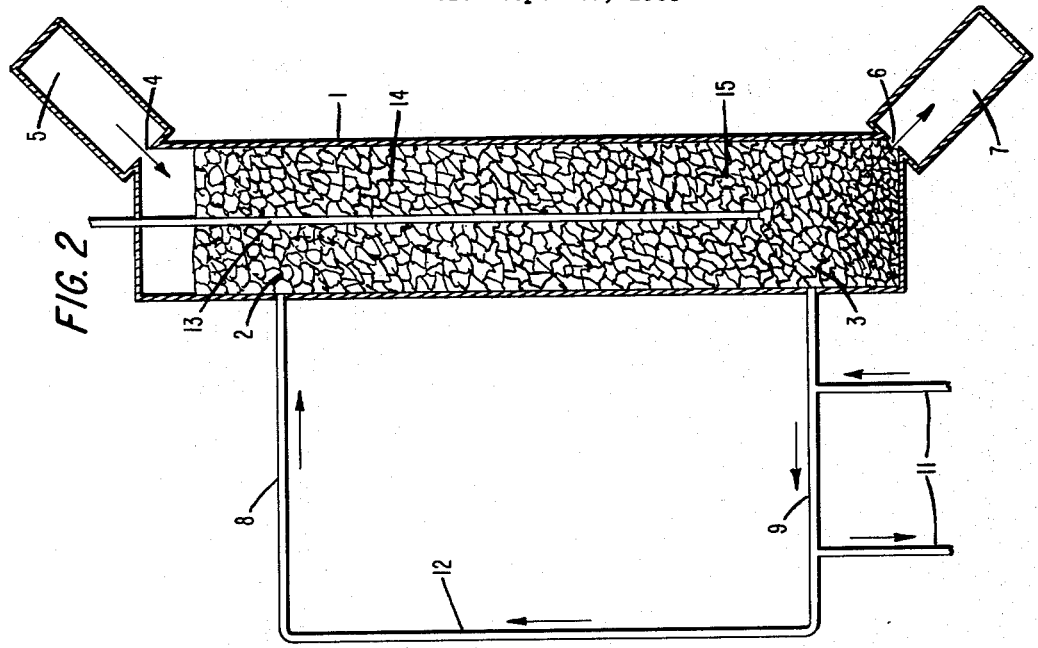
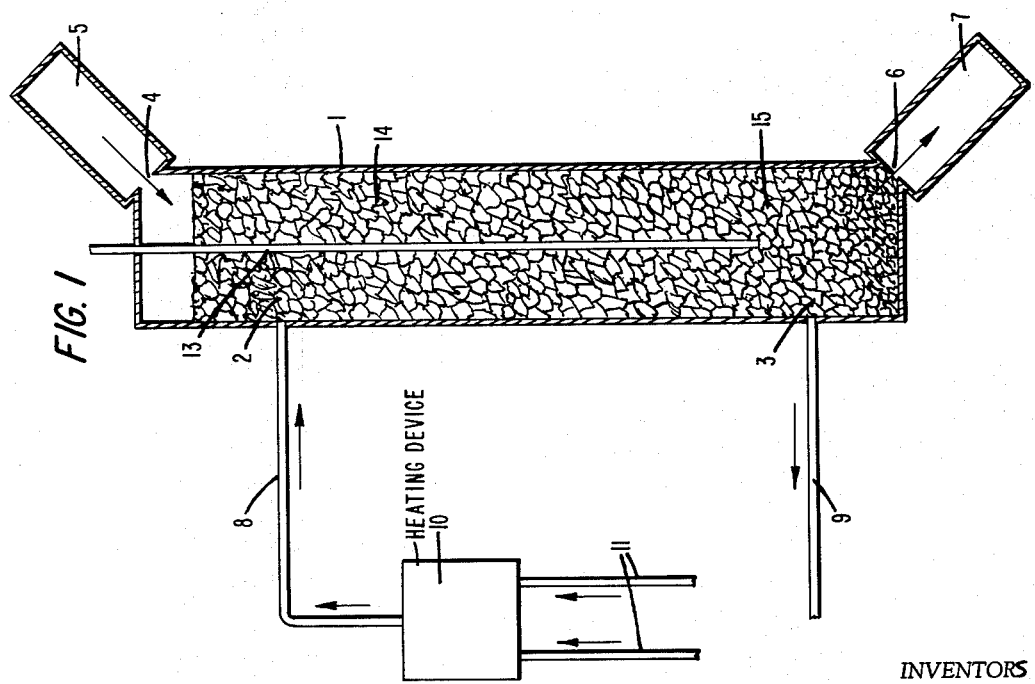

3,248,171
PREPARATION OF PURIFIED ALUMINUM NITRIDE
Maurice Noble, 5 Rue Villars, and Louis A. Ruelle, 41 Blvd. J. J. Vallier, both of Grenoble, Isere, France
Filed Sept. 10, 1963, Ser. No. 307,937
Claims priority, application France, Sept. 26, 1962, 910,486
11 Claims. (Cl. 23—192)

This invention relates to the preparation of a relatively pure aluminum nitride by the removal of carbon contained as an impurity in the raw product and it relates more particularly to the burning out or roasting of carbon from the carbon containing impure aluminum nitride but without undesirable effect on the aluminum nitride.

It is known from our earlier researches to manufacture purified aluminum nitride by treatment of aluminum nitride containing up to 10% by weight of carbon by controlled oxidation in the presence of air diluted with an inert gas and at a temperature which does not exceed 850° C. to effect elimination of residual carbon.

Applicants have succeeded in carrying out selective roasting of the impure aluminum nitride contaminated with carbon when arranged in thin layers. For this purpose, the impure aluminum nitride, in particle form, was placed on metal or perforated metal sheets and a current of air at a temperature within the range of 600–800° C. was blown over or through the layers. The particles of aluminum nitride were maintained out of contact one with the other in the layers which were arranged to extend throughout the height of the roasting furnace but in which the layers were maintained separated into batches and/or separated from the walls of the furnace by means, such as metal sheets, metal gauze, etc., on which the particles were supported.

It is of paramount importance to maintain proper control of the temperature of the reaction. It has been found that in the aforementioned system it is difficult properly to adjust the temperature throughout the mass since the temperatures subject to measurement relate to the temperature of the gases and not that of the reaction mass. Further, the arrangement of the raw material in particulate form in multiple layers introduces a number of other objections to commercial practice of the process, such as the need to make use of bulky apparatus, the need to make use of manipulative steps and the generation of a large amount of dust, and the limitation of the process to batch operations.

Thus it is an object of this invention to provide a method and means for the removal of carbon from impure aluminum nitride without noticeable loss of aluminum nitride thereby to provide a purified aluminum nitride of great commercial value and it is a related object to provide a method and means of the type described for roasting aluminum nitride to remove residual carbon, and in which such process can be carried out to produce a product at high yield and of high purity, in which such yield and purity can be constantly obtained, in which the heat requirements and costs of operation are at a minimum and which is adaptable to continuous operation for utilization of the heat released from the reaction and for continuous production of product at low cost and constant yield.

These and other objects and advantages of this invention will hereinafter appear and for purposes of illustration, but not of limitation, embodiments of the invention are shown in the accompanying drawings, in which:

FIG. 1 is a schematic diagrammatic view of the processing equipment in the desired arrangement for carrying out the invention, and FIG. 2 is a schematic diagrammatic view similar to that of FIG. 1 showing a modification in the process.

The concepts of this invention are addressed to the purification to remove residual carbon from impure aluminum nitride in which the carbon is present in an amount which does not exceed 12% by weight and wherein the impure aluminum nitride is formed into agglomerates for treatment to provide for free flow through the roasting furnace and to minimize, if not eliminate, the formation of dust.

In accordance with the practice of this invention, the agglomerates are introduced into a reaction chamber which is thermally insulated from the outside and with the agglomerates in contact one with the other substantially throughout the height of the chamber. The agglomerates are fed from the upper end portion of the chamber and the purified product is removed from the lower end portion of the chamber whereby the agglomerates are caused to move gravitationally downwardly through the reaction chamber during the treatment to remove residual carbon.

Concurrently with the passage of the agglomerates downwardly through the chamber, they are treated in parallel flow with a stream of hot gases containing oxygen in an amount which is at least proportional to the amount stoichiometrically required to react with the carbon in the agglomerate and with the oxygen preferably present in admixture with other inert gases such as carbon dioxide, nitrogen, etc. and mixtures thereof. The agglomerates are brought to a temperature within the range of 600–800° C. during passage through the chamber, preferably by direct heat exchange with the hot gases introduced into the reaction chamber. Then the material is maintained by the hot gases and by the heat released from reaction at an elevated temperature not to exceed 800° C. for a time sufficient to complete the reaction for burning out carbon. By reason of the direct contact between the hot gases and the aluminum nitride, heat exchange is maximized to maintain the reaction within the described temperature limitation.

In the practice of the invention the hot gases may be relied upon entirely to heat the aluminum nitride to the desired reaction temperature whereby the aluminum nitride can be fed to the reaction chamber without preheating or, in the alternative, the aluminum nitride can be preheated to an elevated temperature, preferably below reaction temperature, prior to contact with hot gases in the reaction chamber.

In the preferred practice of this invention, the hot gases issuing from the chamber are recycled with an amount of oxygen, preferably in the form of air, admixed with the hot gases exhausted from the reaction chamber in an amount to make up the oxygen consumed in the combustion of carbon thereby to maintain the concentration of oxygen in the hot gases at the desired level. A quantity of exhaust gas equal to the amount added for making up the oxygen is withdrawn from the system. The recycling of the hot exhaust gases with oxygen added in an amount to maintain the desired level for feed back into the chamber for contact with the agglomerates is particularly desirable from the standpoint of thermal efficiency of the system since a heat balance can be maintained between the amount of heat consumed and the amount of heat generated in response to combustion of carbon, even when the agglomerates have a small carbon content, as in the order of about 4%. When the concentration of residual carbon burned out of the aluminum nitride exceeds 4%, it becomes desirable to effect removal of heat from the system, as by the removal of insulation or removal of more hot gas for replacement with cold gases, calculated to provide the desired temperature in the feed gas system.

In the practice of this invention, it is desirable to make use of a feed gas containing oxygen in an amount within the range of 1.7% to 10% by volume. When the process is carried out with a gas having an oxygen content less than 1.7% by volume, there results the danger of having to operate at temperatures above 800° C. with corresponding oxidation of aluminum nitride. On the other hand, when the oxygen content in the feed gas exceeds 10% by volume, the localized combustion of carbon occurs which not only introduces non-uniformity in the reaction product but also generates hot spots and heat which exceed the temperature limits with corresponding oxidation of aluminum nitride.

The roasted aluminum nitride passing into the lower portion of the reaction chamber can be cooled before removal from the chamber but such removal can be effected without precooling.

With reference now to the drawings, FIG. 1 illustrates an embodiment wherein the exhaust from the roasting chamber is not recycled. In the modification illustrated in FIG. 2, the gases exhausted from the roasting chamber are recycled with portions of the exhaust removed and made up by oxygen added to maintain the desired level of oxygen in the hot gases recycled into the reaction chamber. In the drawings, like numerals denote the same elements.

The numeral 1 denotes the chamber in the furnace for carrying out the process of this invention in which the furnace is filled with agglomerates, illustrated by the cross-hatching. The chamber is formed with an upper portion 2 and a lower portion 3 with a housing 5 for feeding crude aluminum nitride through the outlet 4 into the upper end portion 2 of the reaction chamber in which the purified aluminum nitride is discharged from the lower end portion 3 of the chamber through an inlet 6 into the product receiver 7. The gases are circulated from the passage 8 into the upper end portion of the chamber 1 and exhausted through a passage 9 from the lower end portion of the chamber. In the modification illustrated in FIG. 1, the gases introduced into the chamber through the passage 8 are first heated to elevated temperature in the heating device 10 through which the gases are circulated. The auxiliary gas ducts, for introduction of gases into the system, are illustrated by 11. In the modification illustrated in FIG. 2, the exhaust from passage 9 is recirculated to the passage 8 through the communicating passage 12. The chamber is provided with a thermometer 13 positioned along the central axis of the chamber and the numerals 14 and 15 are intended generally to indicate the levels for the beginning and the end respectively of the selective combustion of the crude aluminum nitride.

In the following examples, which are given by way of illustration and not by way of limitation, the proportions of materials employed correspond to the introduction of 4 kg. per hour of impure aluminum nitride into the reaction chamber 1. The volume of gas is calculated at 0° C. and 760 mm. of mercury. The temperatures given are for conditions achieved after the reaction process has become stabilized. The quality of the purified nitride is substantially the same in both examples.

*Example 1*

The raw material fed into the reaction chamber 1 comprises impure aluminum nitride in the form of agglomerates containing 6% by weight carbon, 92.5% by weight aluminum nitride, and 1.5% by weight aluminum oxide.

A gaseous mixture formed of oxygen and nitrogen is passed in heat exchange relationship through a heating element in the form of a heating unit 10 to raise the temperature of the gaseous mixture to 700° C. The hot gaseous mixture is introduced through the insulated passage 8 into the insulated stainless steel reaction chamber 1 at a rate of 53,040 liters which is made up of 5,000 liters of air and 48,040 liters of nitrogen to provide a gaseous mixture having a content of about 1.9 parts by volume oxygen per 100 parts by volume of gas introduced. The air and nitrogen are fed into the heating chamber in the desired amounts through ducts 11 for admixture and heating.

The impure aluminum nitride, at about ambient temperature, is introduced in a gas-tight manner from the device 5 through the orifice 4 into the upper portion of the reaction chamber 1.

The raw material travels gravitationally downwardly through the chamber for ultimate discharge in a gas-tight manner as a purified aluminum nitride through the orifice 6 into the receiver 7. The agglomerates of impure aluminum nitride are raised to a temperature of about 600° C. by heat exchange with the hot gases while in the upper portion 14 of the reaction chamber but below the inlet from the passage 8 through which the hot gases are introduced. At this temperature, carbon contained in the impure aluminum nitride commences to burn. Combustion is completed by the time that the agglomerates reach the level 15 in the lower portion of the reaction chamber, the temperature of the agglomerates rising in the interim gradually from 650° C. to about 740° C. during passage through the chamber. At no time does the temperature of the agglomerates exceed 740° C. When the purified agglomerates of aluminum nitride pass below the level 3, corresponding generally to the outlet into the passage 9, they will be subjected to cooling before discharge of the purified product into the receiver 7 connected in a gas-tight manner to the chamber.

The gases will be exhausted from the lower portion of the chamber into the passage 9 at a temperature of about 740° C. and the exhausted gases will contain carbon dioxide as a reaction product.

The temperature conditions existing at the various levels can be determined by thermometers positioned with their bulbs at different selected levels within the stainless steel tube 13. The product delivered from the reaction chamber is a purified aluminum nitride containing about 0.3% by weight residual carbon, 1.7% by weight aluminum oxide and about 98% by weight aluminum nitride. The purification is achieved at the expenditure of 5.6 kw. per hour per kg. of impure aluminum nitride for maintaining the thermal equilibrium of the process.

At the start of the process, the hot gases circulated through the furnace will be free of oxygen until the agglomerates are brought up to the desired temperature of about 650° C. for reaction. Thereafter, the desired amount of air is admixed into the gases to supply the desired concentrations of oxygen for reaction. The additional heating to raise the temperature of the agglomerates to 740° C. results from the heat released by the combustion of carbon.

*Example 2*

The process of Example 2 makes use of the heat of combustion for maintaining the temperature levels in the gaseous system by recirculation of the exhaust from passage 9 through passage 12 and into passage 8 for introduction into the reaction chamber with suitable adjustments in between to replenish the oxygen consumed in the reaction and to adjust the temperature level of the gases to maintain the desired temperature conditions within the reaction chamber.

In order to bring the reaction chamber, filled with agglomerates of aluminum nitride, to the desired temperature level for stabilized operation, the gases circulated through the chamber are initially heated from an external source, such as by electrical heaters and the like (not shown).

When the normal operating temperatures are reached, the heat generated in response to the combustion of carbon is usually sufficient to maintain the temperature whereby additions of heat from external sources is usually not required. When reaction conditions are achieved, 2440 liters of air is introduced into passage 11 for admixture with 53,040 liters of gas circulated through the system and a corresponding 2440 liters of exhaust is removed from the system from the other passage 11. Thus the gaseous mixture introduced into the reaction chamber through the passage 8 will consist of a mixture of oxygen, nitrogen and carbon dioxide in which the oxygen content will be at a level of about 5% by volume and the yield based upon oxygen consumption will be about 25%.

By comparison with Example 1, it will be unnecessary to expend electrical energy or other energy to maintain the desired thermal balance. In fact, it will often be necessary, as when the residual carbon exceeds 4%, to effect removal of heat as by removal of all or part of the insulation lining the passages 8, 9 and/or 12, or by removel of insulation from about the reaction chamber, or by bleeding cold air into the system, or by heat exchange to recover some of the excess heat for other purposes.

It will be apparent from the foregoing that we have provided a simple and more efficient means for the roasting of aluminum nitride to burn out residual carbon in a continuous operation whereby a purified product of high yield can be secured at low cost.

It will be understood that changes may be made in the details of construction and operation of the equipment and the conditions during the reaction thereof without deparing from the spirit of the invenion, especially as defined in the following claims.

We claim:

1. A continuous process for removal of residual carbon from impure aluminum nitride in which carbon is present in an amount up to 12% by weight, comprising the steps of introducing agglomerates of the impure aluminum nitride into an upper portion of a vertically disposed reaction chamber with the agglomerates substantially in contact one with another substantially to fill the chamber, removing the agglomerates from which residual carbon has been removed at a lower portion of the container and at a rate generally corresponding to the rate of feed whereby the agglomerates fall gravitationally through the intervening portions of the reaction chamber, introducing a stream of hot gases into an upper portion of the reaction chamber and exhausting gases from a lower portion of the reaction chamber whereby the stream of hot gases travels in parallel flow with the agglomerates through the reaction chamber and comes into direct contact with the agglomerates for direct heat transfer therewith, said stream of hot gases being formed of a mixture of oxygen and inert gases with the amount of oxygen corresponding to at least the stoichiometric proportion for reaction with residual carbon in the impure aluminum nitride and in which the hot gases are introduced into the reaction chamber at a temperature within the range of 600–800° C. to heat up the agglomerates during contact therewith, maintaining the hot gases in contact with the agglomerates for a time at least to burn out residual carbon contained in the agglomerates, the gaseous stream operating also to prevent heat of combustion of the carbon from raising the temperature of the agglomerates to beyond 800° C.

2. The process as claimed in claim 1 in which the oxygen is present in the hot gases introduced into the reaction chamber in an amount within the range of 1.7% to 10% by volume.

3. The process as claimed in claim 1 in which the hot gases are formed of a mixture of oxygen and an inert gas selected from the group consisting of nitrogen and carbon dioxide.

4. The process as claimed in claim 1 in which the agglomerates are fed into the reaction chamber from an agglomerate feeding device which is sealed with respect to the reaction chamber to avoid the introduction of gases into the chamber through said device.

5. The process as claimed in claim 1 in which the purified aluminum nitride is removed from the reaction chamber into a receiver which is sealed with respect to said chamber to avoid the passage of gases into the chamber from the receiver.

6. A continuous process for removal of residual carbon from impure aluminum nitride in which carbon is present in an amount up to 12% by weight, comprising the steps of introducing agglomerates of the impure aluminum nitride into an upper portion of a vertically disposed reaction chamber with the agglomerates substantially in contact one with another substantially to fill the chamber, removing the agglomerates from which residual carbon has been removed at a lower portion of the container and at a rate generally corresponding to the rate of feed whereby the agglomerates fall gravitationally through the intervening portions of the reaction chamber, introducing a stream of hot gases into an upper portion of the reaction chamber and exhausting gases from a lower portion of the reaction chamber whereby the stream of hot gases travels in parallel flow with the agglomerates through the reaction chamber and comes into direct contact with the agglomerates for direct heat transfer therewith, said stream of hot gases being formed of a mixture of oxygen and inert gases with the amount of oxygen corresponding to at least the stoichiometric proportion for reaction with residual carbon in the impure aluminum nitride and in which the hot gases are introduced into the reaction chamber at a temperature within the range of 600–800° C. to heat up the agglomerates during contact therewith, maintaining the hot gases in contact with the agglomerates for a time at least to burn out residual carbon contained in the agglomerates, the gaseous stream operating also to prevent heat of combustion of the carbon from raising the temperature of the agglomerates to beyond 800° C., recirculating the hot gases exhausted from the lower portion of the reaction chamber for feed into the upper portion of the reaction chamber, adding an amount of oxygen to the recirculated gases to bring the oxygen content up to the desired level and bleeding a corresponding amount of the recirculated gases from the gaseous system.

7. The process as claimed in claim 6 in which the oxygen is added to the recirculated gases in the form of air.

8. The process as claimed in claim 6 in which the hot gases introduced into the reaction chamber have an oxygen content within the range of 1.7% to 10% by volume.

9. The process as claimed in claim 6 in which the hot gases are formed of a mixture of oxygen, nitrogen and carbon dioxide.

10. The process as claimed in claim 6 which includes the step of removing some of tht heat from the recirculated hot gases by bringing the hot gases into heat exchange relationship with a cooling means when the temperature of the gases exhausted from the reaction chamber exceeds the temperature of the gases introduced into the reaction chamber.

11. The process as claimed in claim 6 which includes the step of removing some of the heat from the recirculated gases by bringing the hot gases into heat exchange relationship with a cooling means when the amount of residual carbon in the impure aluminum nitride exceeds 4% by weight.

No references cited.

BENJAMIN HENKIN, *Primary Examiner.*

MAURICE A. BRINDISI, *Examiner.*